(12) United States Patent
Pozar et al.

(10) Patent No.: US 7,107,965 B2
(45) Date of Patent: Sep. 19, 2006

(54) CONTROLLING SPARK OF AN ENGINE WITH ADJUSTABLE INTAKE VALVE TIMING

(75) Inventors: Michael Pozar, Cupertino, CA (US); Robert Stein, Saline, MI (US); Jeff C. Lyjak, Ann Arbor, MI (US); Marcus W. Fried, Farmington Hills, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/345,751

(22) Filed: Feb. 2, 2006

(65) Prior Publication Data

US 2006/0123770 A1 Jun. 15, 2006

Related U.S. Application Data

(62) Division of application No. 10/920,690, filed on Aug. 18, 2004, now Pat. No. 7,069,909.

(51) Int. Cl.
*F02P 5/15* (2006.01)
*F02D 43/04* (2006.01)

(52) U.S. Cl. .......................... 123/406.47; 123/406.55; 123/406.59; 60/285

(58) Field of Classification Search ............. 123/90.11, 123/90.15, 90.17, 295, 305, 406.47, 406.55, 123/406.59; 60/274, 285
See application file for complete search history.

(56) References Cited

U.S. PATENT DOCUMENTS

| 6,302,082 | B1 * | 10/2001 | Nagatani et al. | ............. 123/305 |
| 6,438,943 | B1 * | 8/2002 | Yamamoto et al. | ........... 60/274 |
| 6,513,488 | B1 * | 2/2003 | Enoki et al. | ................. 123/305 |
| 6,837,040 | B1 * | 1/2005 | Sonoda et al. | ................ 60/284 |
| 2001/0006058 | A1 * | 7/2001 | Kawasaki et al. | ..... 123/406.45 |
| 2002/0066436 | A1 * | 6/2002 | Majima et al. | ........ 123/406.47 |

* cited by examiner

*Primary Examiner*—T. M. Argenbright
(74) *Attorney, Agent, or Firm*—Donald J. Lewis; Allan J. Lippa

(57) ABSTRACT

A system and method to control spark timing of an engine wherein the injection timing of the engine is varied relative to a crankshaft position depending on engine operating conditions. According to the method, spark timing is varied as fuel injection timing varies for at least a portion of the engine operating range. The method can reduce fuel consumption, reduce transient fuel requirements, improve engine performance, and reduce CO emissions, at least under some conditions.

19 Claims, 11 Drawing Sheets

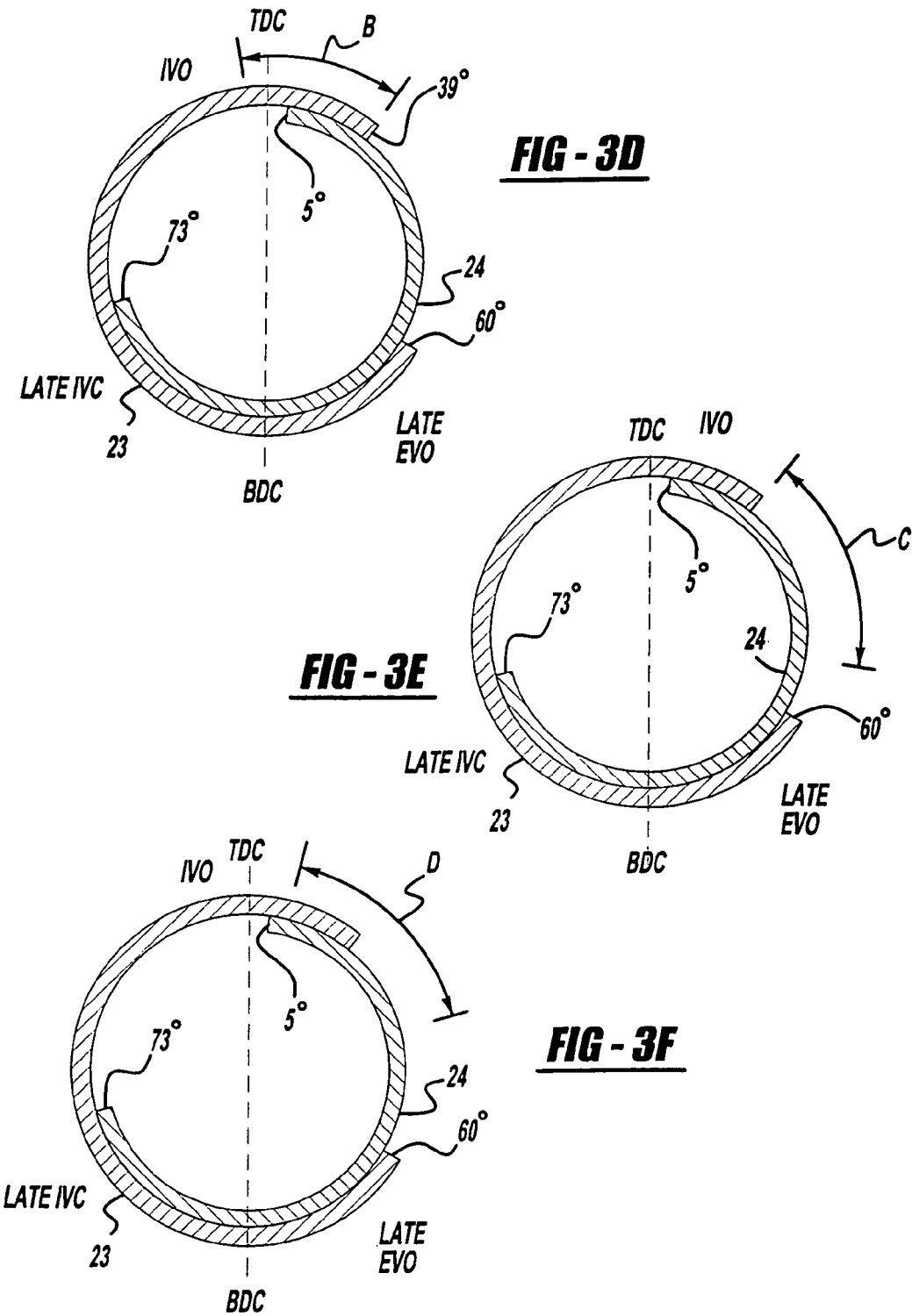

| | | | | |
|---|---|---|---|---|
| 1 | 460 | 460 | 460 | 460 |
| 0.9 | 460 | 460 | 460 | 460 |
| 0.8 | 460 | 460 | 460 | 460 |
| 0.7 | 430 | 430 | 430 | 430 |
| 0.6 | 410 | 410 | 410 | 410 |
| 0.5 | 400 | 400 | 400 | 400 |
| 0.4 | 400 | 400 | 400 | 400 |
| 0.3 | 400 | 400 | 400 | 400 |
| 0.2 | 400 | 400 | 400 | 400 |
| 0.1 | 400 | 400 | 400 | 400 |
| CYLINDER LOAD | 500 | 1500 | 2500 | 5000 |
| | ENGINE SPEED | | | |

FIG - 9

| | | | | |
|---|---|---|---|---|
| 0.75 | 0 | 0 | 0 | 0 |
| 0.6 | 19 | 22 | 0 | 0 |
| 0.55 | 27 | 31 | 0 | 0 |
| 0.45 | 41 | 44 | 0 | 0 |
| 0.4 | 47 | 50 | 44 | 0 |
| 0.3 | 48 | 50 | 51 | 0 |
| 0.25 | 42 | 46 | 0 | 0 |
| 0.2 | 36 | 41 | 0 | 0 |
| 0.15 | 21 | 24 | 0 | 0 |
| CYLINDER LOAD | 500 | 1500 | 2500 | 5000 |
| | ENGINE SPEED | | | |

FIG - 10

CONTROLLING SPARK OF AN ENGINE WITH ADJUSTABLE INTAKE VALVE TIMING

The present application is a divisional U.S. Ser. No. 10/920,690, titled CONTROLLING AN ENGINE WITH ADJUSTABLE INTAKE VALVE TIMING, filed Aug. 18, 2004 now U.S. Pat. No. 7,069,909, the entire contents of which are incorporated herein by reference in their entirety for all purposes.

FIELD

The present description relates to a method for controlling an engine having at least adjustable fuel injection timing and more particularly to a method for controlling spark angle based on fuel timing and intake valve timing.

BACKGROUND

Piston driven internal combustion engines commonly have valvetrains that affect flow into and out of a cylinder. Intake and exhaust valve opening and closing positions, relative to crankshaft position, can be at fixed positions, or alternatively, at positions that vary with engine operating conditions. Typically, for engines having adjustable valve timing, engine operating conditions are used as a basis to adjust valve and spark timing.

One method to adjust engine spark timing for an engine having variable intake valve timing is described in U.S. Pat. No. 6,681,741. After engine starting, this method adjusts spark advance based partially on opening timing of an intake valve. Further, the method describes retarding intake valve timing so that air-fuel mixing may be improved and so that the engine can tolerate spark retard to increase catalyst heating.

The above mentioned method also has a disadvantage. Namely, the method does not account for the fuel injection timing and its affect on the heat of vaporization and spark timing. Therefore, the method does not benefit from of several advantages that may be available as a result of open valve fuel injection.

When fuel is injected to an intake port on a closed intake valve the fuel can form a puddle in the intake port. Opening the intake valve causes at least a portion of the fuel puddle to be drawn into the cylinder, but since the fuel is drawn from a puddle it may be more difficult to vaporize. On the other hand, if at least a portion of the fuel is injected while the intake valve is open then air-fuel mixing and/or fuel vaporization may be improved. As a result, open intake valve fuel injection may provide changes in minimum spark for best torque and/or charge cooling that may permit additional spark advance. Consequently, it can be beneficial to adjust spark timing in response to the effect injection timing has on air-fuel mixing and/or fuel vaporization.

The inventors herein have recognized the above-mentioned disadvantages and have developed a method to control spark timing for an engine having variable intake valves.

SUMMARY

One embodiment of the present description includes a method of delivering spark to an internal combustion engine, the method comprising: injecting fuel to a cylinder of said internal combustion engine, between a start and an end position relative to said crankshaft; and delivering spark to said cylinder at an angle that varies as said end position of said fuel injection varies.

By varying spark advance as the end of fuel injection varies it is possible to benefit from improved fuel mixing and improved fuel vaporization that may result from injecting fuel during an open intake valve event. For example, improved air-fuel mixing during part throttle conditions can slow the rate of combustion and shift the minimum amount of spark advance for best torque. As a result, engine knock tendency can decrease and may allow additional spark advance so that fuel economy may be improved.

The present description may provide several advantages. For example, the approach may be used to improve engine fuel economy by allowing additional spark advance as the engine knock tendency decreases. Further, the method can account for improved fuel vaporization and improved air-fuel mixing since the method can determine how long fuel is injected while the intake valve is open.

The above advantages and other advantages, and features of the present description will be readily apparent from the following detailed description of the preferred embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 3D is an alternate fuel injection timing for an engine with adjustable intake valve timing, cam position phase is adjusted to a retarded position, fuel injection occurs during a period beginning with a closed intake valve and ends at a position where the intake valve is open;

FIG. 3E is yet another alternate fuel injection timing for an engine with adjustable intake valve timing, cam position phase is adjusted to a retarded position, fuel injection occurs during a period beginning after the exhaust valve is closed, subsequent to a period of positive intake and exhaust valve overlap;

FIG. 3F is yet another alternate fuel injection timing for an engine with adjustable intake valve timing, cam position phase is adjusted to a retarded position, fuel injection occurs during a period beginning after the intake valve is opened and continues until after the exhaust valve has closed, subsequent to a period of positive intake and exhaust valve overlap;

FIG. 9 is one example of an injection timing map for an engine with variable intake valve timing;

FIG. 10 is one example of an intake valve timing map for an engine with variable intake valve timing;

DETAILED DESCRIPTION

Figure 1:
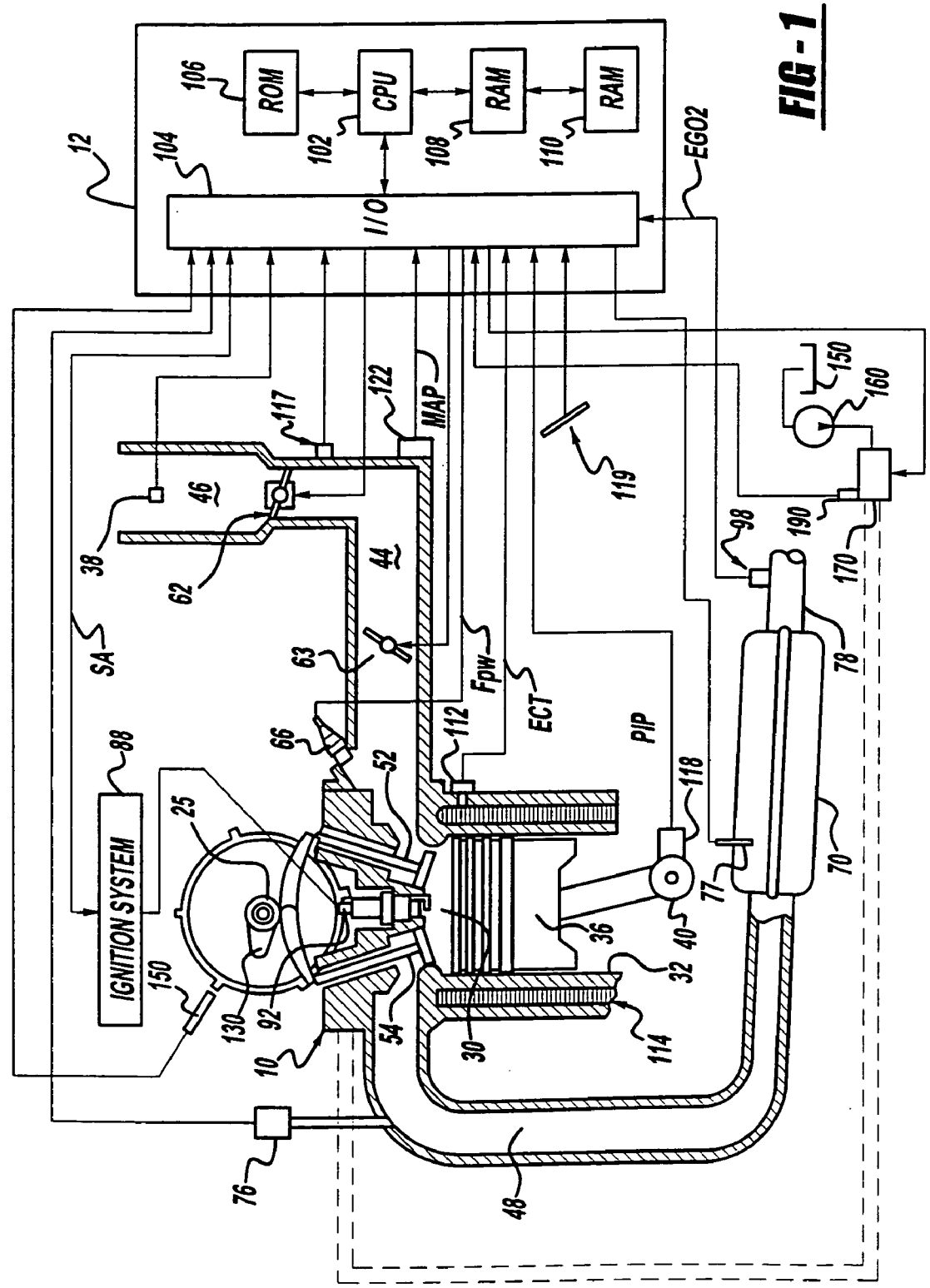
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Alternatively, mechanically driven valve 52 may be replaced by an electrically actuated valve (not shown) or electromechanically actuated valves may replace valves 52, 54, and camshaft 130. Cam phase actuator 25 is shown coupled to camshaft 130. Oil reservoir 150 supplies oil to pump 160, pressurized oil is supplied from the pump to cam phase actuator 25 via valve 170 based on commands from engine controller 12.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 Keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber.

Figure 2:
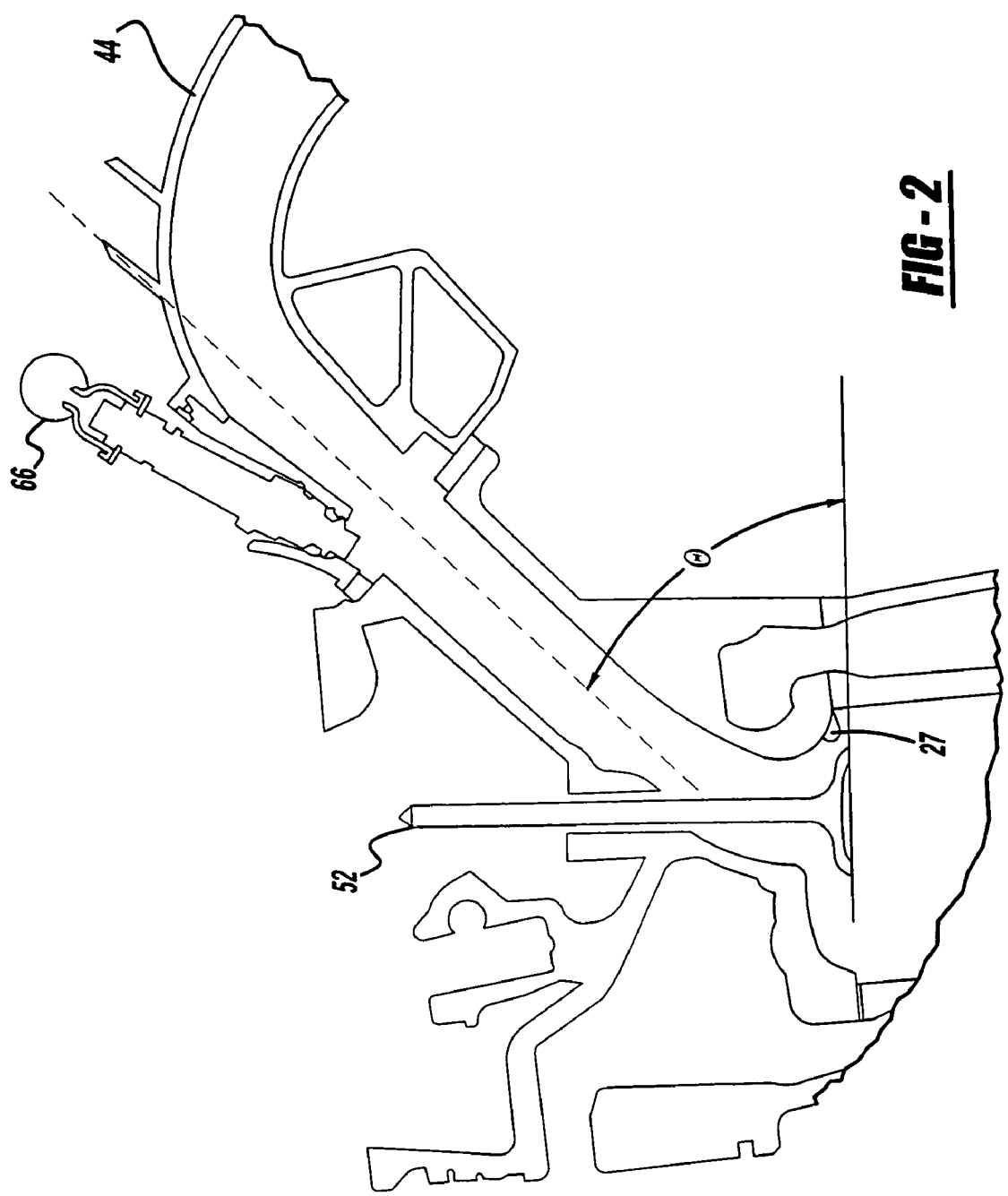
FIG. 2 is a schematic diagram that shows an injector placed in an intake port, targeting an intake valve.

Referring to FIG. 2, a schematic diagram that shows an injector 66 located in an intake port, targeting an intake valve 52. The intake port centerline is placed at a high angle (e.g., greater than about 40, 45, 50, 55, 60, 65, 70, 75, or 80 degrees) relative to the plane of the intake valve face. The angle is denoted as the angle θ. The high intake port angle can improve air flow to the cylinder, and it may also improve air-fuel mixing while injecting on an open or closed intake valve. Further, it may reduce the amount of fuel that has not vaporized, and that may come into contact with the cylinder wall.

Transient fuel response can also be improved by targeting selected areas of the port that can produce predictable fuel puddle masses (e.g., smooth surfaces wherein flow velocity increases as the intake valve opens). By designing an intake port to provide increased flow and by selecting a desirable injector location, modeling of complex fuel puddles may be reduced or avoided. For example, if an injector is positioned to target a mating surface between an intake manifold and a cylinder head, a puddle mass may be established that retains fuel until a specific port velocity is reached. Then, after the port velocity is reached, fuel may be released at an increased rate. This effect and others may be reduced by improving intake port design and injector targeting.

Intake charge can also be influenced by valve mask 27. As the intake valve begins to open the in-rushing charge encounters the valve mask. The motion and mixing of the charge may be influenced by the valve mask depending on the engine operating point, fuel injection timing, cam timing, and cam profile.

Figure 3A:
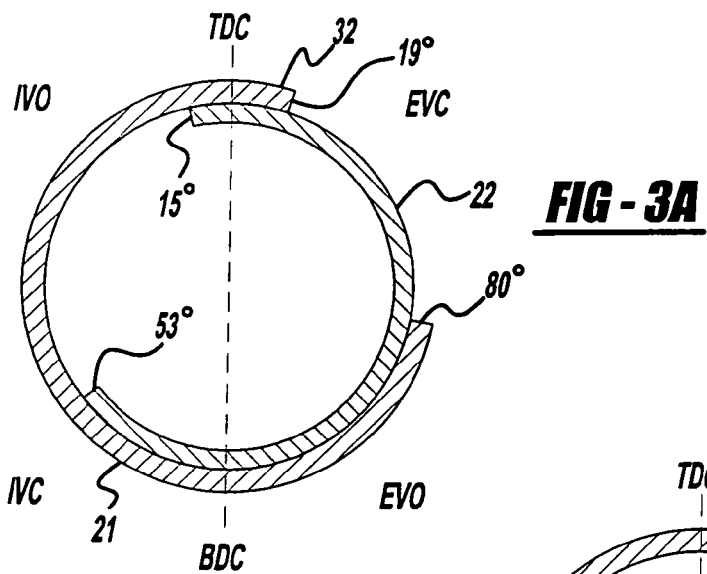
FIG. 3A is an exemplary diagram showing the valve overlap and valve timing of an engine with nominal fixed valve timing.

Referring to FIG. 3A, an exemplary diagram of nominal valve overlap and valve timing for an engine is shown.

Exhaust valve open timing is represented by the outer ring 21. Intake valve open timing is represented by the inner ring 22. The valve timings are referenced to cylinder positions top-dead-center (TDC) and bottom-dead-center (BDC). Notice, the intake valve opening (IVO) and exhaust valve closing (EVC) overlap is centered near TDC. Also, notice that intake valve closing (IVC) and exhaust valve opening (EVO) are centered near BDC. These valve timings may be set to provide a compromise between performance and fuel economy throughout the engine operating range.

Figure 3B:
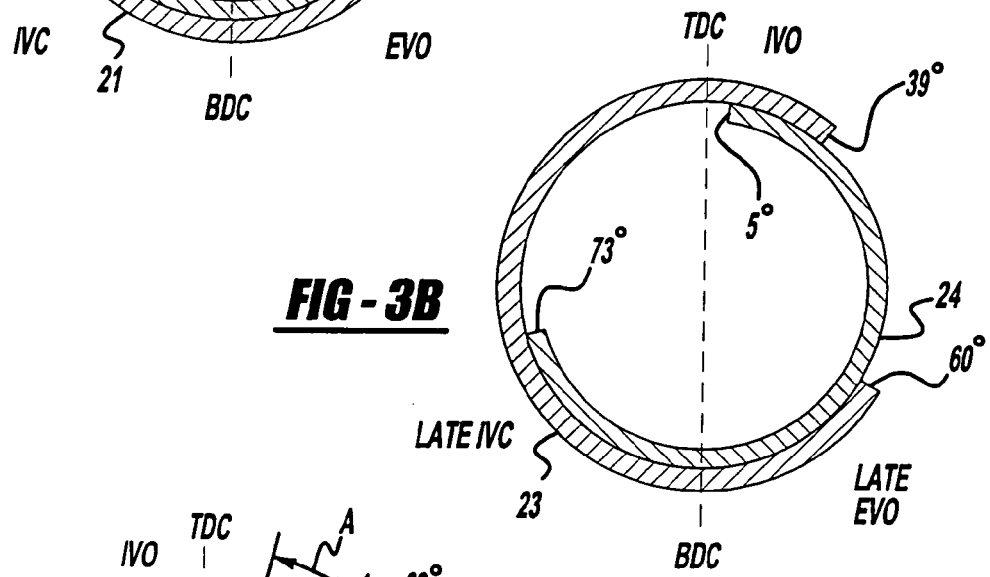
FIG. 3B is an exemplary diagram showing valve overlap and valve timing for an engine with adjustable intake valve timing, cam position phase is adjusted to a retarded position.

Referring to FIG. 3B, an exemplary diagram of valve timing of an engine with adjustable intake valves is shown. In one example, the valve overlap and valve timing can be adjusted using dual equal valve timing control (i.e., exhaust valve timing and intake valve timing are adjusted together by substantially equal amounts). In another example, the valve timing can be adjusted individually for intake and/or exhaust valves (dual independent cam timing). In yet another example, exhaust valve timing may be fixed while intake valve timing is adjustable (intake only cam timing).

Exhaust valve open timing is represented by the outer ring 23. Intake valve open timing is represented by the inner ring 24. As mentioned above, the valve timings are referenced to cylinder positions top-dead-center (TDC) and bottom-dead-center (BDC). Notice, that intake valve opening (IVO) and exhaust valve closing (EVC) overlap is centered after TDC, at roughly 22° after top-dead-center (ATDC). Also, notice that intake valve closing (IVC) and exhaust valve opening (EVO) are centered after BDC, at roughly 6° after bottom-dead-center (ABDC).

The valve timing shown is one example of retarded intake and exhaust valve timing. Accordingly, alternate intake and exhaust valve timings are possible that may provide a compromise between performance and fuel economy throughout the engine operating range. For example, retarded intake valve opening locations may occur within the range of −10, −5, 0, 5, 10, 15, 20, 25, 30, 35, 40, 45, 50, or 55 degrees after TDC intake stroke of a respective cylinder (the minus sign indicates before TDC and intermediate angles between the above-mentioned angles are also possible). While retarded exhaust valve closing locations may occur within the range of 0, 5, 10, 15, 20, 25, 30, 35, 40, 45, 50, 60, or 65 degrees after TDC intake stroke of a respective cylinder (intermediate angles between the above-mentioned angles are also possible). Combinations and sub-combinations of intake opening and exhaust valve closing locations may be used to achieve a desired emission, fuel economy, and/or performance level. As such, the illustration is not meant to limit the breadth or scope of the disclosure.

Figure 3C:
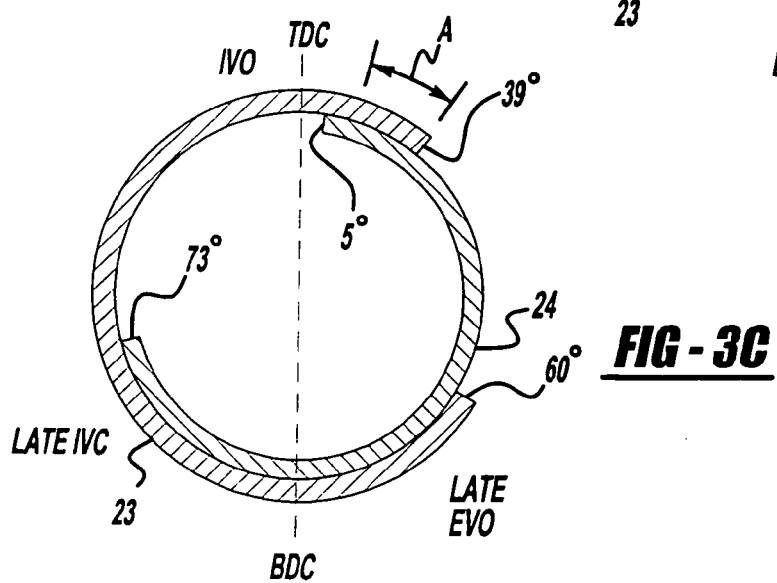
FIG. 3C is an exemplary fuel injection timing for an engine with adjustable intake valve timing, cam position phase is adjusted to a retarded position, fuel injection occurs during a period when the intake valve is open.

Referring to FIG. 3C, an exemplary diagram showing the injection timing of an engine having adjustable intake valve timing control is shown. Exhaust valve open timing and intake valve opening timing is in accordance with the timing illustrated in FIG. 3B. A fuel injection interval is designated "A". Notice, the injection interval is during the interval wherein the intake valve and the exhaust valve openings overlap. Injecting during retarded valve timing after the intake valve opens may improve air-fuel mixing, combustion stability, reduce transient fuel requirements, reduce air-fuel charge temperature, and reduce emissions.

Referring to FIG. 3D, an alternate fuel injection timing for an engine with adjustable intake valve timing is shown. Exhaust valve open timing and intake valve opening timing is in accordance with the timing illustrated in FIG. 3B. A fuel injection interval is designated "B". The injection interval begins prior to the intake valve opening and concludes after the intake valve is open. This injection timing may prove beneficial when transitioning from closed intake valve injection to open intake valve injection. For example, for an engine that has been operating using closed intake valve injection, moving injection timing over a period of time or number of engine combustion events may reduce air-fuel errors that can result from intake manifold fuel puddles. By incrementally moving injecting timing, in lieu of abrupt timing changes, the fuel puddle may reach a new equilibrium point reducing air-fuel errors that may be caused by changing the fuel puddle mass. This can be especially relevant when cam timing is retarded and intake port velocities are increasing.

Referring to FIG. 3E, an alternate fuel injection timing for an engine with adjustable intake valve timing is shown. Exhaust valve open timing and intake valve opening timing is in accordance with the timing illustrated in FIG. 3B. A fuel injection interval is designated "C". The injection interval begins after exhaust valve closing and is subsequent to a period of positive overlap between intake and exhaust valves. This injection timing may prove beneficial when operating a highly tuned engine at increased loads. For example, for an engine that is operating with overlapping open intake and exhaust valves at an increased load, cylinder and manifold pressures may pull uncombusted fuel from the intake manifold to the exhaust manifold. Beginning fuel injection after the exhaust valve is closed may reduce the amount of uncombusted fuel that may be transferred to the exhaust.

Referring to FIG. 3F, an alternate fuel injection timing for an engine with adjustable intake valve timing is shown. Exhaust valve open timing and intake valve opening timing is in accordance with the timing illustrated in FIG. 3B. A fuel injection interval is designated "D". The injection interval begins after intake valve opening and ends after exhaust valve closing and is subsequent to a period of positive overlap between intake and exhaust valves. This injection timing may prove beneficial when the amount of intake and exhaust overlap varies based on engine operating conditions. For example, for an engine that is operating with adjustable independent intake and exhaust valve timing, valve overlap may change with engine operating conditions. By continuing fuel injection after the exhaust valve closes, it may be possible to permit additional fuel to flow into the cylinder so that the injected fuel amount may match increased cylinder air amounts.

Known retarded valve timing strategies can provide less homogenous air-fuel mixtures, more transient fuel compensation, less cylinder charge cooling, and higher engine CO emissions than desired. On the other hand, the above-mentioned method, illustrated in FIG. 3C–3F, may provide additional cylinder charge cooling, improved engine volumetric efficiency at wide-open-throttle, improved air-fuel mixing, reduced CO emissions, and less transient fuel compensation while maintaining lower engine pumping work.

In addition, nominal valve timing and open valve fuel injection may reduce combustion stability, increase the amount of unvaporized fuel that may impinge on the cylinder wall, and reduce air-fuel mixing. In contrast, the above-mentioned method, illustrated in FIG. 3C–3F, may provide improved combustion stability, reduce fuel impingement on the cylinder wall, improve air-fuel mixing, again, while maintaining lower engine pumping work.

The intake valve timings described above may be achieved using intake only, dual equal, dual independent, or electrically actuated valve actuation devices. In addition the exhaust valve timings described above may be fixed or may be achieved using dual equal, dual independent, or electrically actuated valve actuation devices.

The duration of fuel injections shown above are for illustration purposes. Actual injection duration may change relative to engine operating conditions and driver demand. Furthermore, fuel injection timing is shown for illustration purposes and may also vary with intake valve opening and/or exhaust valve closing location. In one example, an engine operating at a substantially constant load, fuel injection duration may be increased as intake valve opening is adjusted from retarded timing to a more advanced timing. As such, the illustrations are not meant to limit the breadth or scope of the disclosure.

Figure 4A:
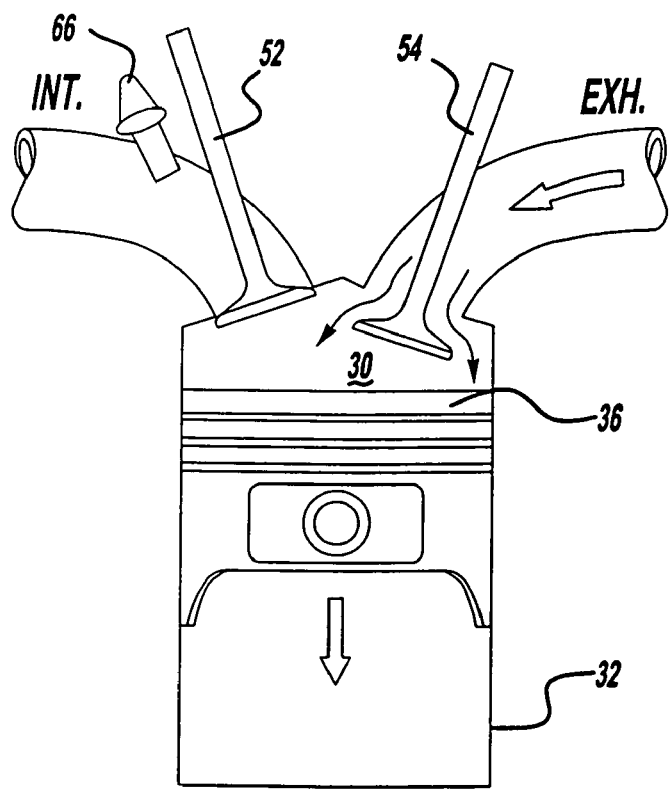
FIG. 4A is a schematic diagram of a piston and cylinder assembly with intake and exhaust valves positioned in accordance with the strategy for the valve timing diagram of FIG. 3C, wherein the overlap for the intake and exhaust valves is delayed during the intake stroke relative to the standard overlap of FIG. 3A.

Referring to FIG. 4A, a schematic diagram of a piston and cylinder assembly with intake and exhaust valves positioned in accordance with the strategy for timing diagram of FIG. 3C is shown. Notice, retarded cam timing produces an open exhaust valve and a closed intake valve during the beginning of the intake stroke as the piston is traveling in a downward direction. This can draw exhaust gases into the cylinder, forming internal exhaust gas recirculation (internal EGR), in preparation for a subsequent combustion event. This may increase the amount of internal EGR when compared to standard valve timing.

Figure 4B:
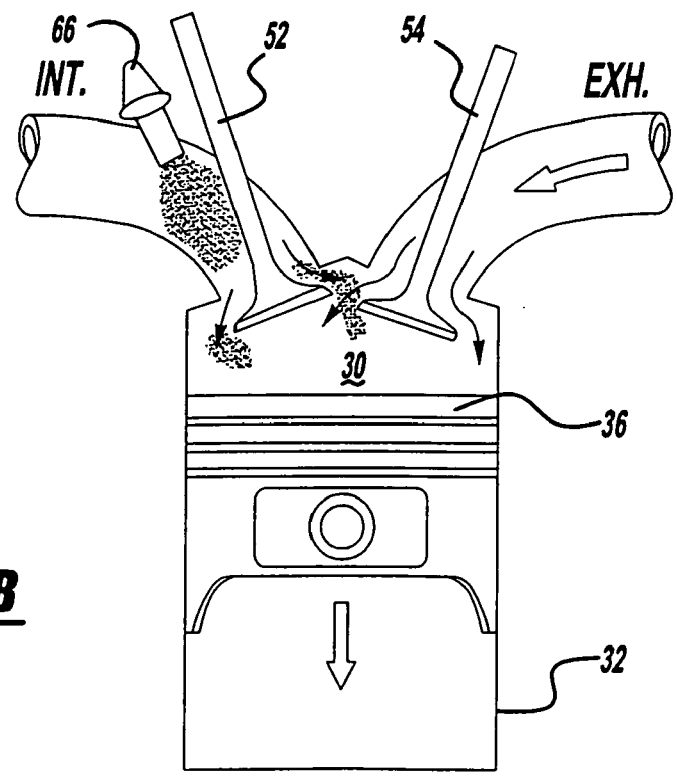
FIG. 4B is a schematic diagram of a piston and cylinder assembly with intake and exhaust valves positioned in accordance with the strategy for timing diagram of FIG. 3C, and includes injecting fuel while the intake valve is open.

Referring to FIG. 4B, a schematic diagram of a piston and cylinder assembly during part of an intake stroke is shown. The piston has traveled to a position later in the intake stroke wherein the intake and exhaust valves are simultaneously open. Furthermore, injector 66 is shown delivering fuel to the cylinder. This figure illustrates fuel injection during the intake and exhaust valve overlap period. By opening the intake valve later in the intake stroke the pressure drop and velocity across the intake valve can increase because of increased cylinder vacuum and piston velocity. The amount of increase can depend on intake valve opening location and exhaust valve closing location. As the intake valve begins to open the pressure drop across the valve can increase the flow rate of air into the cylinder. Injecting fuel while port velocity is increased (air flow through the port is increasing) and while the intake valve is open can improve air-fuel mixing at part load conditions resulting in a slower charge burn rate and a advance of minimum spark for best torque (MBT). Further, during higher load conditions, the inducted charge may cool due to the heat of vaporization (i.e., the heat of the incoming charge is used to vaporize the fuel). The shift in MBT or the charge cooling may permit additional spark advance without producing engine knock (detonation). In addition, improved air-fuel mixing can reduce carbon monoxide (CO), improve combustion stability, allow increased EGR amounts, and support leaner air-fuel mixtures which may be used to advantage during cold starts or with NOx traps. Furthermore, the additional spark advance that may be available, resulting from decreased knock tendency, may be used to improve fuel economy.

Figure 4C:
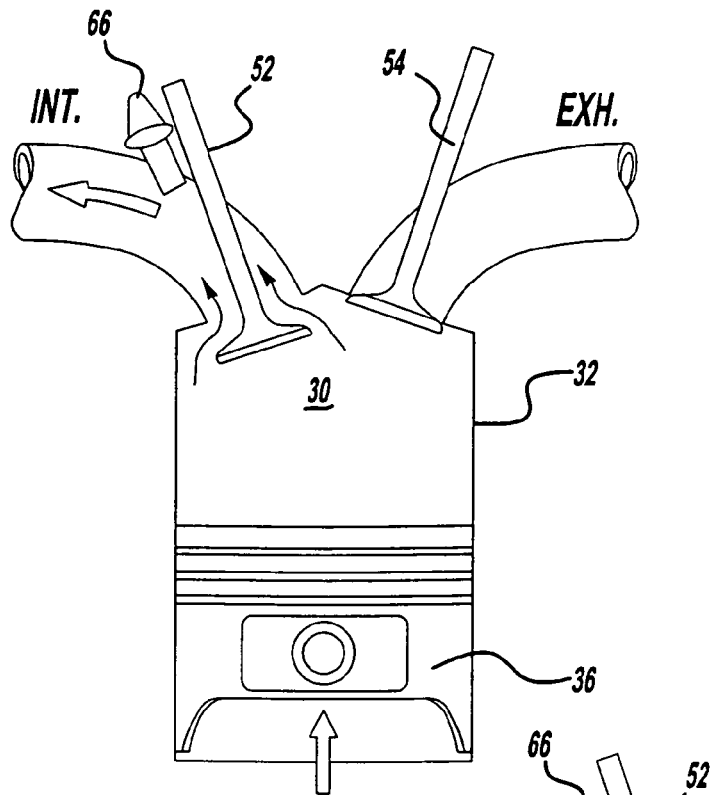
FIG. 4C is a schematic diagram of a piston and cylinder assembly with intake and exhaust valves positioned in accordance with the strategy for timing diagram of FIG. 3C, wherein the closing of the intake valve is delayed during the compression stroke relative to the standard timing of FIG. 3A.

Referring to FIG. 4C, a schematic diagram of a piston and cylinder assembly during part of a compression stroke is shown. During the compression stroke, the retarded intake valve timing allows some of the fresh charge to pass the intake valve. This necessitates an increased intake manifold pressure to produce equivalent torque, thereby yielding reduced pumping work. The portion of air-fuel mixture pushed back into the intake runner is combusted during a subsequent combustion event.

Figure 4D:
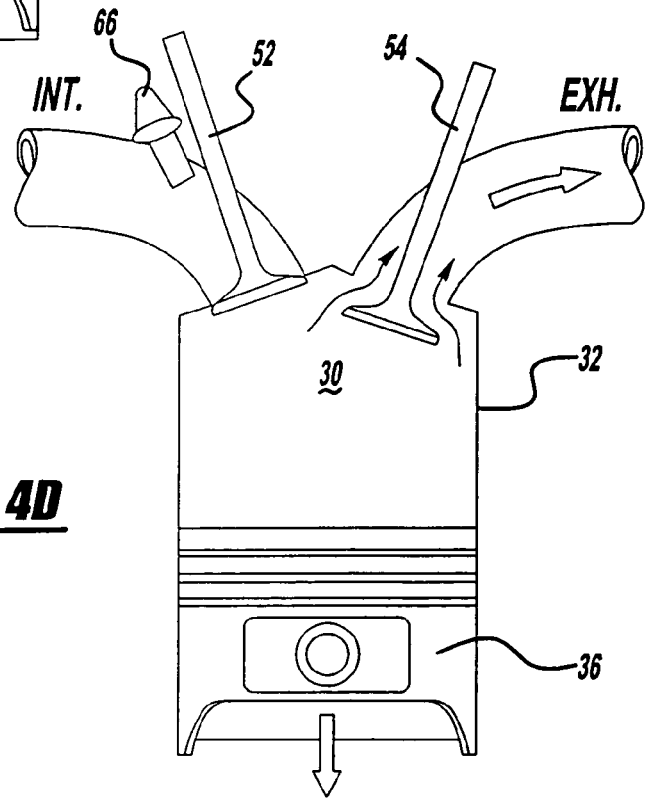
FIG. 4D is a schematic diagram of a piston and cylinder assembly with intake and exhaust valves positioned in accordance with the strategy for timing diagram of FIG. 3C, wherein the opening of the exhaust valve is delayed during the expansion stroke relative to the standard timing of FIG. 3A.

Referring to FIG. 4D, a schematic diagram of a piston and cylinder assembly during part of an expansion stroke, while exhaust valve timing is retarded, is shown. This valve timing is used at low and mid range engine speeds to increase expansion work. Notice, the exhaust gases are allowed to exit the cylinder when the piston is closer to BDC. This can increase expansion work and increase fuel economy. Furthermore, open valve injection shown in FIG. 4B may increase NOx due to combusting a homogenous air-fuel mixture at the spark plug. However, the delayed exhaust valve timing illustrated in FIGS. 4A and 4B may be used to reduce these NOx emissions.

Figure 5:
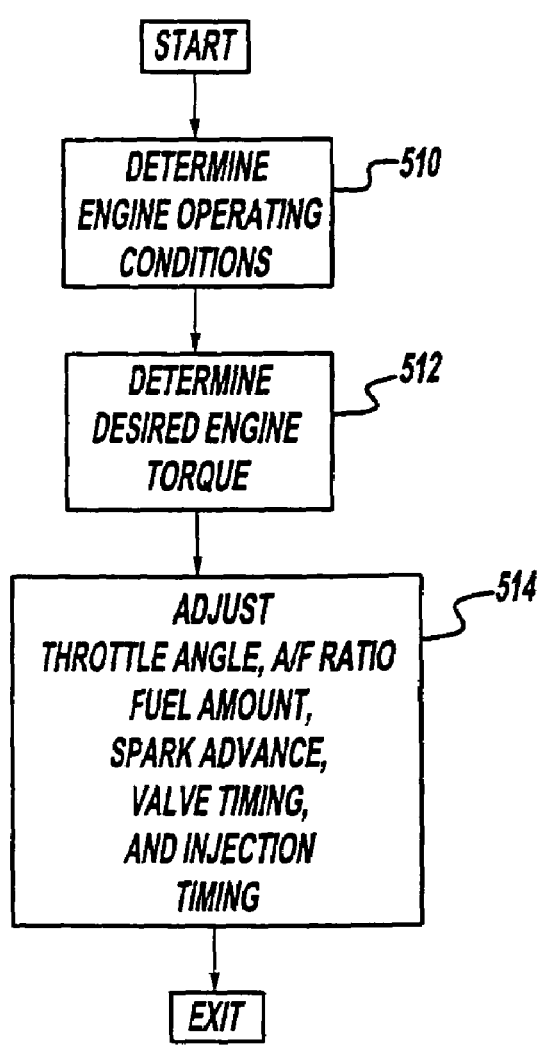
FIG. 5 is a simplified flow diagram showing a control strategy for an engine with variable valve timing.

Referring to FIG. 5, a simplified flow diagram showing a control strategy for an engine with variable valve timing is shown. The routine begins at step 510 by determining engine operating conditions. Operating conditions may include, but are not limited to engine speed, operator torque demand, ambient air temperature, vehicle speed, engine temperature, catalytic converter temperature, cylinder air charge, intake manifold pressure, and/or combinations thereof. These parameters may be measured by sensors or inferred. Sensor signals are converted from physical units (voltage or current) to engineering units via transfer functions. In one example, accelerator pedal position is sensed by controller 12, then, the physical unit is converted to engineering units via a function that relates the physical unit to desired engine brake torque. The routine continues to step 512.

In step 512, desired indicated torque can be determined from desired engine brake torque and various torque losses. Indicated torque is calculated by the following equation:

$$\text{Ind\_Tor} = \text{Dsd\_Brk\_Tor} + \text{Fric\_Tor} + \text{Loss\_Tor}$$

Wherein Ind_Tor represents the desired indicated engine torque, Dsd_Brk represents the desired engine brake torque, Fric_Tor represents the engine friction torque, and Loss_Tor represents the engine torque losses (e.g., accessories such as electrical loads and/or power steering pumps). The routine continues to step 514.

In step 514, engine control devices are commanded to deliver the desired indicated engine torque. Namely, spark is scheduled, the throttle position is set, cylinder fuel amounts and timing are determined, valve timing is set, and desired air-fuel ratio is determined.

Cam positions can be determined by accessing predetermined tables that are indexed by engine speed and desired indicated torque. Furthermore, engine operating conditions can modify base cam timing by providing a timing offset that is based on engine operating conditions. For example, when catalyst temperatures increase from a start until operating temperature is reached, additional cam retard or advance may be allowed based on the current catalyst temperature. Dual independent cam systems may use separate tables for intake and exhaust timing whereas intake only and dual equal cam systems can use a single table that controls both intake and exhaust cam positions. Control logic may select between tables to compensate for altitude and/or temperature variation. In one example, engine speed and desired indicated torque are indices into table FNCAM. Based on the current engine speed and indicated torque a cam position is output from FNCAM, 20° retarded for example. A representative cam schedule is shown in FIG. 10, for example.

The throttle command can be determined by converting the desire indicated engine torque into a desired load for the cylinders of the engine, converting the desired load into an intake manifold pressure, and determining a throttle angle from the desired manifold pressure.

Cylinder load (a fraction of the total air capacity of a cylinder, e.g., 0.5 load corresponds to half of the theoretical air charge capacity of a cylinder) can be determined by the following equation:

$$\text{Load} = F\text{NLOAD}(N, (\text{Ind\_Tor} * 1/\text{FNSPKRTO}(SAF)))$$

Wherein FNSPKRTO is a function that relates spark retard from MBT to a corresponding torque loss, Ind_Tor is desired indicated torque and when multiplied by 1/FNSPKRTO produces corrected indicated torque, N is engine speed, and FNLOAD is a predetermined table that is indexed by engine speed and corrected indicated torque to output a fractional cylinder load, 0.5 for example.

Next, the determined cam position, output from FNCAM as described above, along with the engine speed are used to index tables FNSLP and FNOFSET. A slope is output from FNSLP and an offset is output from FNOFSET. Since there is a linear relationship between manifold pressure and cylinder air charge, see the description of FIG. 12 for example, at a given engine speed and cam position, the equation of a straight line (y=mx+b) can be used to determine manifold pressure from cylinder air charge. Where y can be replaced by manifold pressure, m is the slope of the line, b is the offset of the line, and x can be replaced by cylinder air charge. For example, an engine operating at a speed of 1500 rpm with 10° of cam retard, and having a desired cylinder air charge of 4×10 −4 is multiplied by a slope of 22732 then added to an offset of 0.999. The corresponding manifold pressure is determined to be 10.09 In—Hg. Interpolation may be used to determine manifold pressure in regions where exact mapping points do not exist. In addition, compensation can be provided for barometric pressure and air charge temperature.

Then, the desired air flow through the engine is determined. Cylinder load can be used to determine the desired air flow by the following equation:

$$Des\_am=sarchg \times N \times (numcyl/2) \times Load$$

Wherein Load is cylinder load determined by the above-mentioned method, numcyl is the number of cylinders in the engine, N is engine speed, and sarchg is the cylinder air charge capacity at standard temperature and pressure.

The desired throttle angle can then be determined from the desired air flow and the pressure drop across the throttle body (barometric pressure minus MAP) by indexing table FNANGLE. Furthermore, the throttle angle retrieved from FNANGLE can be adjusted by feedback from a manifold pressure sensor 112 or from an air flow meter 38. The desired throttle position is then commanded to the electronic throttle 62.

Figure 6:
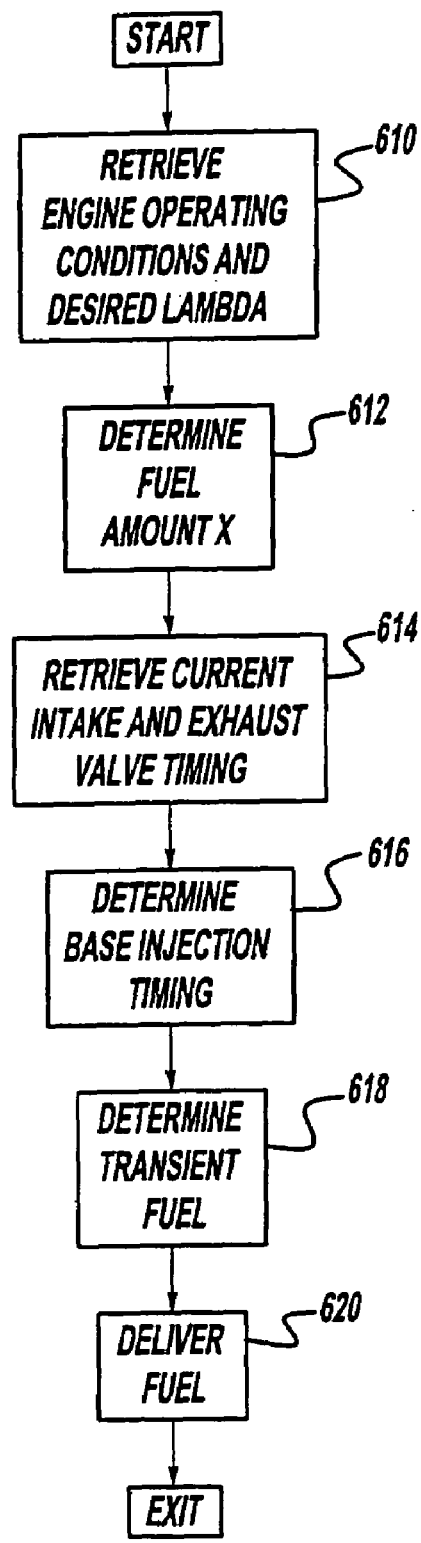
FIG. 6 is a flow diagram showing a fuel strategy for an engine with variable intake valve timing.
Figure 7:
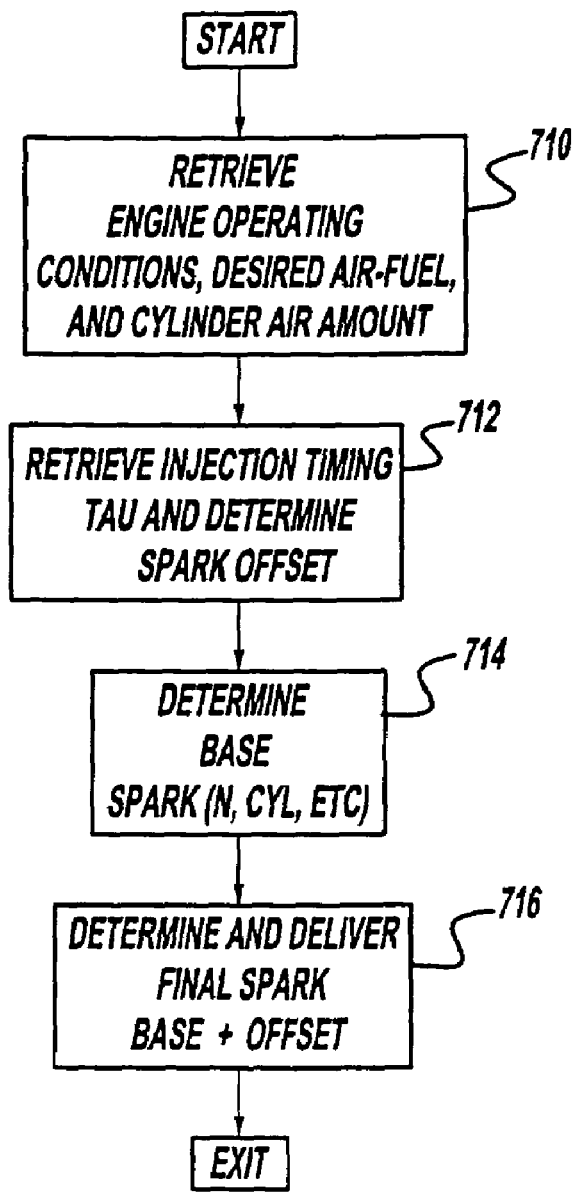
FIG. 7 is a flow diagram showing a spark strategy for an engine with variable intake valve timing.
Figure 8:
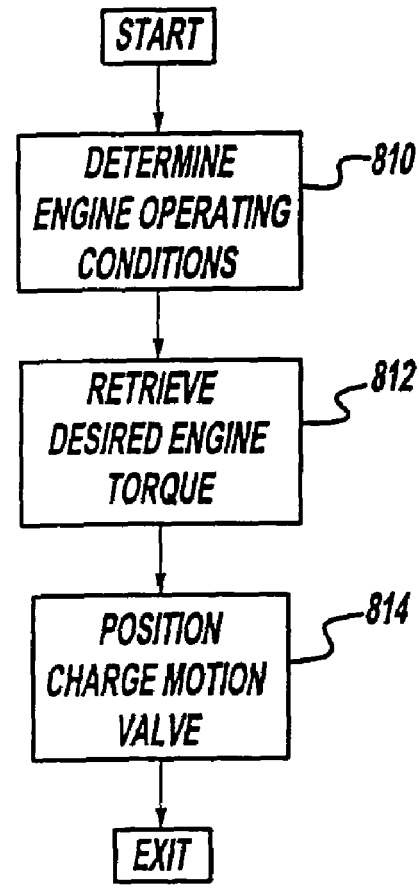
FIG. 8 is a flow diagram showing a charge motion control valve strategy for an engine with variable intake valve timing.

Fueling, spark, and charge motion control valve position are determined and implemented in step 514 by the strategies described in the flow diagrams of FIGS. 6, 7, and 8, respectively. The routine then proceeds to exit.

Referring to FIG. 6, a flow diagram of one example fuel delivery strategy is shown. Improvements in fuel economy, emissions, and performance may be achieved by coordinated valve timing and fuel injection. Certain engine operating points can produce improved engine operation when cam timing is retarded and when injection occurs during a closed intake valve interval. However, a different engine operating point may produce improved engine operation at different cam timing and when injection occurs during an open intake valve interval. The strategy described by the flow diagram of FIG. 6 can provide different valve timing and injection timing for a variety of engine operating conditions.

The routine begins at step 610 where engine operating conditions are determined. These conditions may include, but are not limited to, engine temperature, engine speed, ambient air temperature, engine operating time, cam position, time since start, catalyst temperature, the number of engine combustion events, and/or combinations thereof.

In addition, a base desired Lambda is determined by indexing a table, FNFUELBASE, by engine temperature and engine load. The table has x dimension units of engine temperature (ECT) and y dimension units of time since start. Alternatively, catalyst temperature may be substituted for engine temperature. Lambda is calculated as follows:

$$\text{Lambda } (\lambda) = \frac{\frac{Airmass}{Fuelmass}}{\frac{Airmass}{Fuelmass_{stoichiometry}}}$$

In general, the base fuel demand is a stoichiometric mixture during warmed-up engine operation and moderate engine loads. Fuel is typically enriched at lower temperatures and at increased engine loads. The routine proceeds to step 612.

In step 612, a base fuel mass for each cylinder, $m_{f_{des}}$, is determined based on the cylinder air amount from FIG. 5, step 514, and the Lambda value retrieved in step 610. Fuel mass for a cylinder can be calculated as follows:

$$m_{f_{des}} = \frac{Cyl\_Air\_Amount}{\frac{Airmass}{Fuelmass_{stoichiometry}} \text{Lambda}}$$

The routine then continues to step 614.

In step 614, intake and exhaust valve timing can be determined from cam position. In one example, the base cam timing is in the fully advanced position. When control logic of controller 12 determines that retarded cam timing is permissible, the cam is moved to a desired position as described in FIG. 5, step 514. At base cam timing intake and/or exhaust valve opening and closing positions can be defined. That is, the intake valve opens at 15° BTDC of the intake stroke and closes at 53° ABDC of the intake stroke, for example. Thus, if the cam is retarded 20° the intake valve can open at 5° ATDC of the intake stroke and can close 73° ABDC of the intake stroke, for example. The routine then passes the valve timing information to the next step, 616.

In another example, a mechanism may change the valve duration and the valve lift amount by switching cam profiles. The valve timing and lift information is passed on to step 616.

In yet another example, for engines having electrically actuated valves (e.g., valves that have at least a solenoid including electromechanical, electrohydraulic, electropneumatic, etc.), intake and/or exhaust valve opening and closing positions can be determined from scheduled valve timing. The routing then passes the valve timing information to step 616.

In step 616, the end of fuel injection location, relative to TDC of the compression stroke for the selected cylinder, is determined. Injection timing can be determined from the following equation:

ENDINJ=FNENGINJ(Load, N)+FNCAMINJ(CUR-CAM,ECT)+FNCMOFF(CMCVON, N)

Wherein the end of injection location, ENDINJ, is an engine position relative to TDC of the compression stroke of a selected cylinder, expressed in degrees. FNENGINJ is a table with empirically determined entries that are indexed by cylinder load, Load, and engine speed, N. FNCAMINJ is a table with empirically determined entries, expressed in crank angle degrees, indexed by current cam position (CURCAM) and engine temperature (ECT). Alternatively, valve lift may be substituted for cam position and/or catalyst temperature may be substituted for engine temperature. FNCMOFF is a table that is indexed by charge motion control valve position (CMCVON) and engine speed (N), reference FIG. 8, step 812, of the charge motion control flow diagram, for example. The table outputs an offset, expressed in crank angle degrees (positive or negative), to compensate for charge motion control effects on fuel injection timing. This method can allow injection to occur while intake valves are closed, open, or while the intake valve goes from a closed position to an open position. Furthermore, by inserting values that are beyond the exhaust valve closing (EVC) position, fuel that may be transported through a cylinder while an engine is operating at highly tuned operating point may be reduced. Alternatively, intake valve opening position may be substituted for current cam position as an index into FNCAMINJ.

When engine operating conditions can cause injection timing to move from injecting during a closed intake valve to injecting during an open intake valve or vice-versa, an additional time constant or event delay filter can be used to provide a smooth transition of the injection ending location by simply filtering the above-mentioned injection end timing. In one example, a constant or function may be used to determine the transition interval from open to closed valve injection. If a desired cylinder injection ending location moves from 20° BTDC of an intake stroke (closed valve) to a position of 30° ATDC of an intake stroke (open valve) and 5 degrees of adjustment are allowed per cylinder combustion event, 10 cylinder combustion events can occur before the injection ending point reaches the target location. Alternatively, a low pass filter with a fixed or variable time constant may also be implemented to smooth the injector timing transition. Of course, a simple step transition may also be used.

By populating the tables that determine the end of injection location, namely, FNENGINJ, FNCAMINJ, and FNCMOFF, injection timing may follow the examples shown in FIG. 3C–3F, for example. The routine continues to step 618.

In step 618, transient fuel is determined. When an engine is dynamically operated, i.e., operated over a range of engine operating conditions, engine fuel adjustments may be made to compensate for engine temperature, intake manifold temperature and pressure, and intake port air flow velocity.

Fuel puddle mass can be determined with the method in accordance with U.S. Pat. No. 5,746,183 and is hereby fully incorporated by reference. The fuel mass to enter a cylinder can be determined from:

$$m_{f_{trans}}(k) = \left[ \frac{X \cdot m_{f_{des}}(k) - m_p(k-1)\left(\frac{1}{\tau+1}\right)}{1-X} \right]$$

and $$m_{f_{inj}}(k) = m_{f_{des}}(k) + m_{f_{trans}}(k)$$

Where $m_{f_{trans}}$ is the mass of the transient fuel, k is the cylinder event number, $\tau$ is a time constant, X is a fraction of the injected fuel that goes into an intake port puddle, $m_{f_{des}}$ is the desired mass of fuel entering the cylinder, $m_p$ is the mass of the fuel puddle in the intake port, and $m_{f_{inj}}$ is the mass of fuel to be injected. Furthermore, X and $\tau$ are determined from:

$X$=FNMANPUDLE(MAP,$N$)+FNTEMPUDLE(ECT,T)+FNCAMPUDLE(CAMFUELX(IVO, EVC),$N$)

and $\tau$=FNTEMTAU(ECT,T)+FNCAMTAU(CAMFUELT(IVO, EVC),$N$)

Where FNMANPUDLE is a table of empirically determined values of X based on manifold pressure and engine speed, FNTEMPUDLE is a table of empirically determined values of X based on engine temperature (ECT) and time since start (T), and FNCAMPUDLE is table of empirically determined values of X based on cam timing (CAMFUELX) and engine speed (N). The function denoted CAMFUELX is a table of empirically determined values of X based on intake valve opening location (IVO) and exhaust valve closing location (EVC). By combining IVO and EVC into a single table, compensation for the effects of delayed intake valve timing and variable valve overlap can be accomplished. Since IVO and EVC define both intake valve opening and valve overlap, both can affect the intake port fuel puddle mass. For example, if an engine has a base cam timing that opens an intake valve at 10° BTDC intake stroke, and is operating at 40° of cam retard, the intake valve can begin to open at 30° ATDC intake stroke. Opening the intake valve at this point in the intake stroke may increase the intake charge velocity and charge motion. However, the position of the exhaust valve closing may also affect the intake stroke charge velocity. If there is sufficient intake and exhaust valve overlap, the late closing exhaust valve may result in an increased pressure in the cylinder. Thus, a lower pressure drop across the intake valve may reduce the intake stroke charge velocity. Table CAMFUELX is constructed to compensate for IVO and EVC timing. The time constant $\tau$ is determined from the sum of FNTEMTAU and FNCAMTAU. Where FNTEMTAU is a table of empirically determined values of $\tau$ based on engine temperature (ECT) and time since start (T), FNCAMTAU is a table of empirically determined values of $\tau$ based on cam timing (CAMFUELT) and engine speed (N). The function CAMFUELT is a table of empirically determined values $\tau$ based on intake valve opening location (IVO) and exhaust valve closing location (EVC). The CAMFUELT table can be influenced in a manner consistent with the above-mentioned CAMFUELX table, but it is influenced in terms of the time constant $\tau$. The routine proceeds to step 620.

In step 620, fuel is delivered to the selected cylinder. After fuel mass is calculated, fuel pulse width is determined from the calculated fuel mass and a function that represents the time to deliver a given fuel mass. The fuel amount is then delivered to the engine, beginning at the start of injection location and ending at the determined end of injection location. The start of injection location is determined by taking the end of injection location, from step 616, in crankshaft angle degrees, and adding the injection time (units of milliseconds) multiplied by the engine speed (units of deg/milliseconds) to the start of injection location. Then the routine exits.

Referring to FIG. 7, a flow diagram of one example spark delivery strategy is shown. The routine begins in step 710 where engine operating conditions are determined. These conditions may include, but are not limited to, engine temperature, engine speed, ambient air temperature, engine operating time, cam position, time since start, catalyst temperature, the number of engine combustion events, and/or combinations thereof. The routine continues to step 712.

In step 712, fuel injection timing is retrieved from FIG. 6, step 616, and in addition, a MBT or borderline spark offset for open valve injection is determined. Once the end of injection location is retrieved from step 616 it can be compared to the intake valve opening position determined from FIG. 5, step 514. If the end of injection location is after the opening of the intake valve, a difference between the end of injection and the intake valve open position is determined in units of crankshaft angular degrees. The determined difference is then used to index function FNINJOFF, a function whose output is added as an offset to the base MBT spark location. Typically, the spark advance offset is between 0 and 5 crank angle degrees of advance. The routine proceeds to step 714.

In step 714, base spark timing and spark timing modifiers are determined. Table FNBASESPK is indexed by engine speed and cylinder load. Individual cells in the table contain empirically determined MBT spark angle advance timings that can be output when an enquiry is made of the table. The spark angle amounts are determined for warmed-up engine operating conditions. However, MBT spark can be affected by engine temperature, exhaust gas residuals (including EGR), intake air temperature, and fuel type. Therefore, functions FNSPKAIR, FNSPKECT, and FNSPKEGR are indexed by and provide compensation for air temperature, engine temperature, and EGR amount respectively. In addition, spark may be advanced or retarded based on catalyst temperature. For example, at lower engine temperatures spark may be retarded to reduce catalyst warm-up time. In contrast, after an engine start wherein increased catalyst temperature conditions exist, spark may be advanced toward MBT at a quicker rate. The routine continues to step 716.

In step 716, the final spark angle is determined. Specifically, the base spark, spark modifiers, and fuel injection based spark offset terms are summed as shown in the following equation:

$$SAF=FNBASESPK+FNSPKAIR+FNSPKECT+FNSPKEGR+FNINJOFF$$

Wherein SAF is the determined final spark advance that is delivered to the engine cylinder via spark plug 92. Note: fuel injected to individual cylinders may be by any of the above-mentioned methods (e.g., open valve, closed valve, etc.) and the injection methods may be different for different cylinders of an engine. For example, a two bank engine (e.g., V8, V6) may inject fuel during an open intake valve for bank one and during a closed intake valve for bank two, depending on engine operating conditions and control objectives. Alternatively, different cylinders may be operated with different injection timing from one cylinder to another. Next, the routine exits.

Referring to FIG. 8, a simplified flow diagram for a charge motion control valve strategy is shown. The routine begins at step 810 wherein engine operating conditions are determined. Operating conditions may include, but are not limited to, engine temperature, engine speed, ambient air temperature, engine operating time, cam position, time since start, the number of engine combustion events, and/or combinations thereof. The routine continues to step 812.

In step 812, the parameters desired engine torque and intake valve timing (or alternatively cam position) are retrieved from FIG. 5, steps 512 and 514, respectively. The parameters are used to index FNCMCV, a table that contains a map of charge motion control positions over an operating range of the engine. The valve can be commanded to a closed or open position based on the output from FNCMCV. If the valve is commanded to a closed position, inducing charge motion on air entering a cylinder, a variable, CMCVON is set to a logical true state. If the valve is commanded to an open position, CMCVON is set to logical false. The state of CMCVON (true or false) can influence the fuel injection starting location determined in FIG. 6, step 616. The routine continues to step 814.

In step 814, the charge motion control valve is set to the desired position. Engine controller 12, FIG. 1, commands charge motion control valve 63, FIG. 1, to an open or closed state based on the desired state determined in step 812. The routine then exits.

Referring to FIG. 9, a representative base fuel injection timing map, FNENGINJ, is shown. The table is indexed by cylinder load (Y-axis) and engine speed (X-axis). Each entry in the table is an end of injection location, relative to TDC compression stroke, expressed in units of crankshaft degrees. For example, an entry of 460 ends fuel injection after 100° of engine rotation during the intake stroke or 460° after TDC compression. Notice, as cylinder load increases the end of injection location becomes later in the intake stroke. In this example, a dependency between engine speed and start of injection is not shown, but a dependency may be created by simply modifying cell entries. Fewer or greater number of table entries are possible by simply changing the table dimensions. Furthermore, the scale of the engine speed and cylinder load indexes may be altered to suit a particular application.

Referring to FIG. 10, a representative intake cam timing map is shown. The table is indexed by cylinder load (Y-axis) and engine speed (X-axis). Each entry in the table is an amount of cam retard, relative to base cam timing, expressed in units of crankshaft degrees. The table shows increased cam retard at low range engine speeds and mid range cylinder loads. In an engine employing a dual equal cam phasing mechanism, the additional cam retard can be indicative of increased internal EGR and lower engine pumping losses in these regions. Intake and/or exhaust valve timing may be determined by taking base valve timing and adding or subtracting cam advance or retard. A fewer or greater number of table entries are possible by simply changing the table dimensions. Furthermore, the scale of the engine speed and cylinder load indexes may be altered to suit a particular application.

Figure 11:
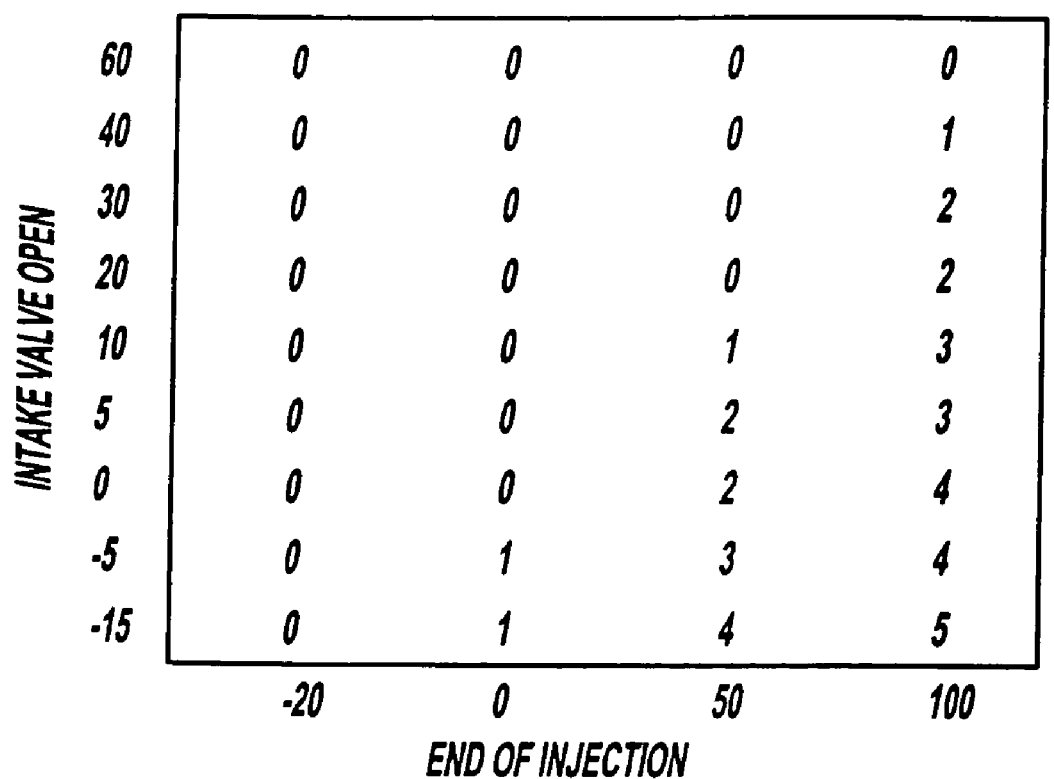
FIG. 11 is one example of a fuel injection timing based spark offset table for an engine with variable intake valve timing.

Referring to FIG. 11, a representative injection timing based spark offset table is shown. The table is indexed by IVO (Y-axis) and EOI (X-axis). Each entry in the table is in units of spark advance, i.e., an entry of 2 would advance spark from 28° to 30°, for example. Positive or negative entries may be placed in the table. The table is capable of capturing spark changes that may result from certain intake valve injection timing combinations or changes in burn rate.

In one example, from the tables of FIG. 9–11, an engine operating at 1500 RPM at a load of 0.92 ends fuel injection at 460 ATDC compression stroke (100 ATDC intake stroke). Referencing FIG. 10, no cam retard is scheduled. Referencing FIG. 11, approximately 4.2° of spark advance is added based on injection timing. In this way, the method described herein may compensate for changes in engine operation that may be influenced by fuel injection timing, cam timing, and combinations thereof.

Figure 12:
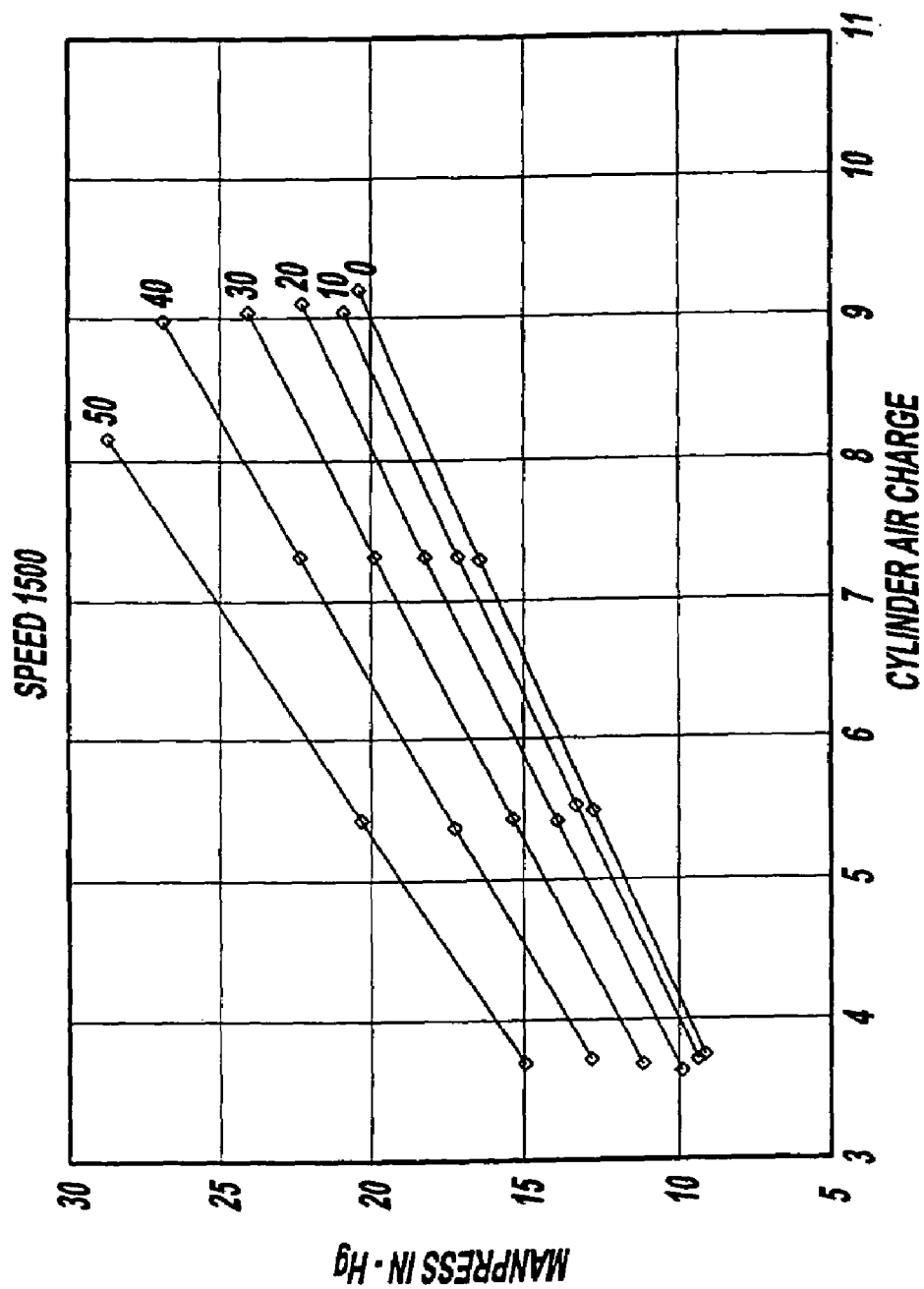
FIG. 12 is a plot that shows a linear relationship between cylinder air charge and manifold pressure for several cam positions.

Referring to FIG. 12, a plot of the relationship between cylinder air charge and manifold pressure at various cam timing locations is shown. Five straight lines labeled 0–50 in increments of 10 represent the linear relationship between cylinder air charge and manifold pressure at a given engine speed. Each line may be represented by the equation of a straight line (y=mx+b). Thus, by looking up predetermined slope and offset values at a given engine speed, manifold pressure can be determined from a desired cylinder air charge for a variety of cam positions.

As will be appreciated by one of ordinary skill in the art, the routines described in FIGS. 5–8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, or alternative fuel configurations could use the present description to advantage.

The invention claimed is:

1. A method of delivering spark to an internal combustion engine, the method comprising:
   injecting fuel to a cylinder of said internal combustion engine, between a start and an end position relative to the engine crankshaft;
   varying said end position relative to the opening position of an intake valve operating in said cylinder; and
   delivering spark to said cylinder at an angle that varies as the variation between said end position and said opening position varies.

2. The method of claim 1 wherein said end position varies as engine speed varies.

3. The method of claim 1 wherein said end position varies with engine temperature.

4. The method of claim 1 wherein said end position varies with air charge temperature.

5. A method of delivering spark to an internal combustion engine having intake valve timing that may be adjusted relative to crankshaft position, the method comprising:
   operating at least one cylinder of internal combustion engine with at least one intake valve having an opening position at a crankshaft angle that varies as engine speed and load vary;
   injecting fuel to said cylinder, between a start and an end position relative to said crankshaft, at least while said intake valve is open; and
   delivering spark to said cylinder at an angle that varies as said end position of said fuel injection varies.

6. The method of claim 5 wherein said delivered spark angle varies as the temperature of said engine varies.

7. The method of claim 5 wherein said delivered spark angle varies as the temperature of air inducted into said cylinder varies.

8. The method of claim 5 wherein said delivered spark angle varies as the amount of air inducted into said cylinder varies.

9. The method of claim 5 wherein said delivered spark angle varies as the speed of said engine varies.

10. The method of claim 5 wherein said delivered spark angle varies as the position of an intake valve cam varies.

11. The method of claim 5 further comprising varying said angle as the temperature of a catalyst varies.

12. A method of delivering spark to an internal combustion engine having intake valve timing that may be adjusted relative to crankshaft position, the method comprising:
   operating at least one cylinder of internal combustion engine with at least one intake valve having an opening position at a crankshaft angle that is retarded from top-dead-center, relative to an intake stroke of said cylinder, where said intake valve opening position is in advance of a closing of an exhaust valve in said cylinder;
   injecting fuel to said cylinder, between a start and an end position relative to said crankshaft, at least while said intake valve is open; and
   delivering spark to said cylinder at an angle that varies as said end position of said fuel injection varies.

13. The method of claim 12 wherein said delivered spark angle varies as the temperature of said engine varies.

14. The method of claim 12 wherein said delivered spark angle varies as the temperature of air inducted into said cylinder varies.

15. The method of claim 12 wherein said delivered spark angle varies as the amount of air inducted into said cylinder varies.

16. The method of claim 12 wherein said delivered spark angle varies as the speed of said engine varies.

17. The method of claim 12 wherein said delivered spark angle varies as the position of an intake valve cam varies.

18. The method of claim 12 further comprising varying said angle as the temperature of a catalyst varies.

19. A computer readable storage medium having stored data representing instructions executable by a computer to control an internal combustion engine of a vehicle, said storage medium comprising:
   instructions for injecting fuel to a cylinder of said internal combustion engine, between a start and an end position relative to the engine crankshaft;
   instructions for varying said end position relative to the opening position of an intake valve operating in said cylinder; and
   instructions for delivering spark to said cylinder at an angle that varies as the variation between said end position and said opening position varies.

* * * * *